United States Patent [19]

Ohkura et al.

[11] Patent Number: 5,974,045
[45] Date of Patent: Oct. 26, 1999

[54] OAM PROCESSING DEVICE IN AN ATM NETWORK

[75] Inventors: Ritsuko Ohkura; Hideaki Mochizuki, both of Kawasaki, Japan

[73] Assignee: Fujitsu Limited, Kanagawa, Japan

[21] Appl. No.: 08/840,510

[22] Filed: Apr. 21, 1997

[30] Foreign Application Priority Data

Oct. 21, 1996 [JP] Japan .................................. 8-277643

[51] Int. Cl.$^6$ ........................... H04L 12/56; H04L 12/28; G06F 11/00
[52] U.S. Cl. ......................... 370/395; 370/242; 370/397; 370/399; 370/402
[58] Field of Search ..................................... 370/389, 392, 370/395, 396, 397, 398, 399, 409, 410, 241, 242, 244, 248, 249, 229

[56] References Cited

U.S. PATENT DOCUMENTS

| | | | |
|---|---|---|---|
| 5,610,913 | 3/1997 | Tomonaga et al. | 370/399 |
| 5,799,003 | 8/1998 | Fujimaki et al. | 370/395 |
| 5,809,012 | 9/1998 | Takase et al. | 370/229 |

FOREIGN PATENT DOCUMENTS 8-237254  9/1996  Japan .

Primary Examiner—Hassan Kizou
Assistant Examiner—Afsar M. Qureshi
Attorney, Agent, or Firm—Helfgott & Karas, PC.

[57] ABSTRACT

An OEM processing device for supporting operations, administration, and maintenance (OAM) in an ATM network, whose control circuit has a simplified configuration that avoids duplexity of common functions, thus realizing reduced size and less power consumption. A VPI/VCI extractor extracts VPI/VCI from each incoming ATM cell, while an alarm detector detects a physical layer alarm. An entry data memory stores a plurality of VPIs/VCIs that have been previously registered. When the extracted VPI/VCI is found in the registered VPIs/VCIs in the entry data memory, a VPI/VCI coincidence signal will be generated. When a physical layer alarm is detected by the alarm detector, all the relevant VPIs related to the detected alarm will be generated by using the same entry data memory. A VP-AIS cell generator then produces VP-AIS cells corresponding to the generated VPIs and inserts them into the current ATM cell stream.

16 Claims, 10 Drawing Sheets

OAM PROCESSING DEVICE IN AN ATM NETWORK

BACKGROUND OF THE INVENTION

1. Field of the Invention

The present invention relates to OAM processing devices to support operations, administration, and maintenance (OAM) functions, and more particularly, to an OAM processing device used to manage the operations and maintenance of Asynchronous Transfer Mode (ATM) networks, being disposed at each ATM network element on local loops that interconnects subscriber premises and a switching system.

2. Description of the Related Art

ATM networks have expanded to cover a wide variety of communication services in recent years, enabling different types of communication traffic to be handled in an integrated way. This diversity in communication services has triggered a demand for more efficient OAM processing at ATM layer that facilitates ATM network management. Miniaturization and power reduction of OAM processing devices are among the key aspects of this demand.

FIG. 10 is a block diagram that shows a part of a conventional OAM processing device. This OAM processing device is designed for use in a network element deployed as part of local loops which connect subscriber premises and a switching system. In FIG. 10, an error detector 101 monitors incoming signals from the switching system to detect errors in communication channels, which signals are either synchronous frames based on the Synchronous Optical Network (SONET) standards or a stream of ATM cells. More specifically, the error detector 101 checks the overhead field of each synchronous frame and generates physical layer alarms when it detected any errors indicated therein, while watching the ATM cell stream to find a Virtual Path Alarm Indication Signal (VP-AIS) cell. When such an error or alarm signal is detected, a registered VPI/VCI generator 102 outputs a plurality of Virtual Path Identifiers (VPIs) and Virtual Channel Identifiers (VCIs) that have been registered beforehand. That is, a list of all VPIs/VCIs that correspond to a plurality of subscriber premises connected to the network element have been previously recorded in the registered VPI/VCI generator 102. When a physical layer alarm is indicated, the registered VPI/VCI generator 102 outputs the VPIs of all virtual paths (VPs) to be affected by the alarm. Similarly, when a VP-AIS cell is detected, the registered VPI/VCI generator 102 supplies the VPIs/VCIs of all virtual channels (VCs) that belong to a VP indicated in the detected VP-AIS cell.

When a physical layer alarm is detected, an OAM cell generator 103 creates OAM cells for VP-AIS (i.e., VP-AIS cell), using the VPIs received from the registered VPI/VCI generator 102, to alert the other network elements of the failure of all VPs related to the physical layer alarm. When in turn a VP-AIS cell is detected, the OAM cell generator 103 creates another kind of OAM cells, or Virtual Channel Alarm Indication Signal (VC-AIS) cells, based on the VPIs received from the registered VPI/VCI generator 102, to signify the failure of all VCs that belong to the failed VP.

An OAM cell switch 104 inserts the OAM cells created by the OAM cell generator 103 into the ATM cell stream. As for the OAM cells in the case of physical layer alarms, the OAM cell switch 104 can simply insert them into the traffic since there are no other valid cells flowing as a cell stream. In the case of VP-AIS cells, however, the OAM cell switch 104 should find idle cells in the cell stream and put the OEM cells in place of the idle cells found.

Separately from the above-described path, each ATM cell is subjected to a VPI/VCI extractor 105 to extract its VPI/VCI fields for verification in an incoming VPI/VCI verifier 106. The incoming VPI/VCI verifier 106 has the records of VPIs and VCIs corresponding to the subscriber premises connected to the network element, just as the registered VPI/VCI generator 102 has. The incoming VPI/VCI verifier 106 verifies each VPI/VCI extracted by the VPI/VCI extractor 105 by comparing it with the records registered therein. If there is such a VPI/VCI record that coincides with the extracted VPI/VCI, the incoming VPI/VCI verifier 106 recognizes the ATM cell as being addressed to one of the subscriber premises connected to the network element, and it will attach a single-bit flag to the 53-byte ATM cell to indicate the coincidence of VPI/VCI.

As described above, the conventional OAM processing devices are equipped with a memory in both the registered VPI/VCI generator 102 and incoming VPI/VCI verifier 106 to store VPIs/VCIs corresponding to the subscriber premises connected to the present network element. The VPI/VCI bit length is 24-bit maximum, and the number of VPs and VCs actually increases as the network element has more physical links. To support this full range of VPIs/VCIs, the registered VPI/VCI generator 102 and incoming VPI/VCI verifier 106 must have a large amount of VPI/VCI storage. This VPI/VCI storage requirement leads to an increased scale of memory circuits, which makes the OEM processing device larger and more power consuming. It is therefore desirable to unify the functions of the registered VPI/VCI generator 102 and incoming VPI/VCI verifier 106 so that they can share a common set of VPI/VCI records.

Meanwhile, to perform ATM switching at the network element, some VPI/VCI conversion tables to translate the VPI/VCI of each ATM cell to new one and means for replacing its header information must be disposed immediately next to the registered VPI/VCI generator 102 and to the incoming VPI/VCI verifier 106. Since this duplexity of VPI/VCI conversion tables will increase the scale of the control circuit, it is also desirable to develop some techniques to unify those functions.

The OAM processing device comprises three major functional units as: alarm handler unit, performance monitor (PM) unit, and usage parameter control (UPC) unit. In conventional OAM processing devices, those units have their own circuit block to extract and verify the VPI/VCI of incoming ATM cells. Furthermore, they individually check the range of the VPI/VCI of each incoming ATM cell based on a predetermined range definition. Such functional duplexity is another factor to increase the scale of the control circuit.

The PM unit provides performance monitoring and measurement functions, where a large amount of measurement data should be collected at predetermined PM block intervals (i.e., time slots for measurement defined by two consecutive PM cells) separately for each VP/VC channel. Actually, the conventional OAM processing devices have a large memory to store the measurement data and a processor to summarize the measurement data for individual VP/VC channels by summing up the data for all PM blocks. This memory requirement makes it difficult to reduce the circuit size and power consumption. Further, since the heavy calculation load is imposed on the processor, it is unable to support enough VP/VC channels.

SUMMARY OF THE INVENTION

Taking the above into consideration, an object of the present invention is to provide an OAM processing device which is reduced in size and power consumption by scaling down its integral control circuit through some techniques introduced to unify the common functions required in different portions of the circuit.

To accomplish the above object, according to the present invention, there is provided an operations, administration, and maintenance (OAM) processing device, disposed in a network element in an Asynchronous Transfer Mode (ATM) network, for supporting management of operations and maintenance of the ATM network.

The OAM processing device comprises several primary elements as follows. Extraction means extracts a Virtual Path Identifier and Virtual Channel Identifier (VPI/VCI) from an incoming ATM cell. Alarm detection means detects a physical layer alarm in an incoming synchronization frame signal. Output means comprises an entry data memory to store a plurality of registered VPIs/VCIs that are previously registered thereto, and in response to the VPI/VCI that is extracted by the extraction means, the output means generates a VPI/VCI coincidence signal when the extracted VPI/VCI coincides with one of the plurality of registered VPIs/VCIs stored in the entry data memory. In response to the physical layer alarm detected by the alarm detection means, the output means generates Virtual Path Identifiers (VPIs) of all Virtual Paths (VPs) to be affected by the physical layer alarm, retrieving all relevant entries out of the entry data memory. VP-AIS cell output means, coupled to the output means, generates a plurality of Virtual Path Alarm Indication Signal (VP-AIS) cells corresponding to the VPIs generated by the output means.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Eight embodiments of the present invention will be described below with reference to the accompanying drawings FIGS. 1 to 9.

Figure 1:
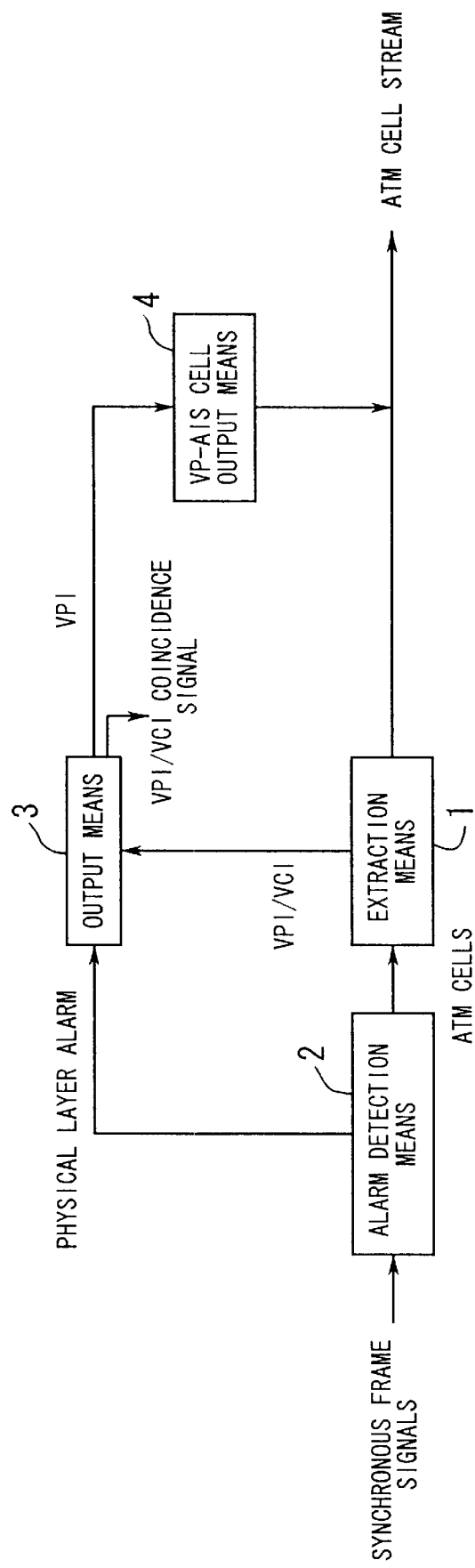
FIG. 1 is a conceptual view of an OAM processing device according to the present invention.

FIG. 1 depicts a first embodiment of the present invention, where the concept of a proposed OAM processing device is represented by four basic elements as defined below. This first embodiment comprises extraction means 1, alarm detection means 2, output means 3, and VP-AIS cell output means 4. The extraction means 1 extracts a VPI/VCI from an incoming ATM cell. The alarm detection means 2 detects a physical layer alarm, while monitoring an incoming synchronization frame signal. The output means 3 stores a plurality of registered VPIs/VCIs that are previously registered thereto. In response to the VPI/VCI extracted by the extraction means 1, the output means 3 generates a VPI/VCI coincidence signal when the extracted VPI/VCI coincides with one of the registered VPIs/VCIs. In response to the physical layer alarm detected by the alarm detection means 2, the output means 3 generates VPIs of all VPs to be affected by the physical layer alarm, by retrieving all relevant entries out of the entry data memory. VP-AIS cell output means 4, coupled to the output means 3, generates a plurality of VP-AIS cells corresponding to the VPIs generated by the output means 3.

In operation, synchronous frames are entered to the alarm detection means 2, and ATM cells contained in each frame are supplied to the extraction means 1. The extraction means 1 takes the VPI/VCI field value out of each ATM cell, while the alarm detection means 2 checks the overhead field of each synchronous frame and detects a physical layer alarm if signified therein.

The output means 3 stores a plurality of VPIs/VCIs that are previously registered. The output means 3 receives the extracted VPI/VCI from the extraction means 1 and compares it with the registered VPI/VCI records. When the extracted VPI/VCI is found in the registered VPI/VCI records, the output means 3 generates a VPI/VCI coincidence signal.

The output means 3 is also responsive to physical layer alarms. That is, when a physical layer alarm is detected by the alarm detection means 2, the output means 3 outputs the VPIs of all VPs pertaining to the detected alarm for use in the VP-AIS cell output means 4. The VP-AIS cell output means 4 produces VP-AIS cells corresponding to the respective VPIs supplied from the output means 3 and puts them into the ATM cell stream.

As described above, the output means 3 solely stores the collection of previously registered VPIs/VCIs and performs both the VPI/VCI comparison and physical layer alarm handling. Unlike the conventional OAM processing devices, the storage functions for the registered VPIs/VCIs are concentrated into the output means 3 in the present invention. Such a unified storage configuration will reduce the size of the memory circuit and thus contribute the miniaturization and power reduction of the OAM processing device.

Figure 2:
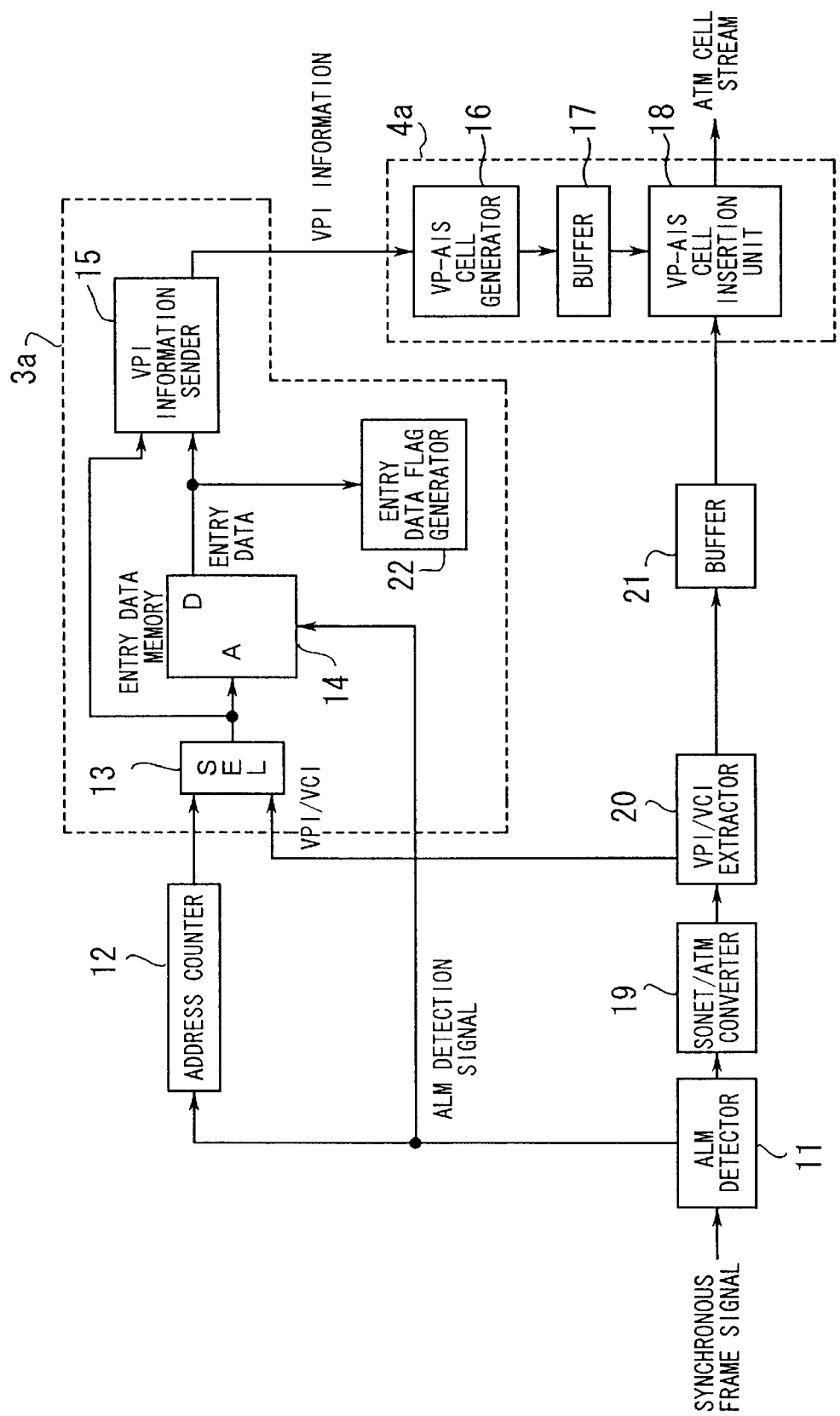
FIG. 2 is a block diagram showing the detailed structure of a first embodiment of the present invention.

Referring next to FIG. 2, the detailed structure of the first embodiment will be presented below.

FIG. 2 is a block diagram of the OAM processing device according to the first embodiment, where signals from a switching system are processed and output to a plurality of subscriber premises. More specifically, SONET synchronous frames sent from the switching system are entered to an alarm (ALM) detector 11. The ALM detector 11 monitors some particular portions of each frame such as the overhead field to detect a physical layer alarm indicated therein. When a physical layer alarm is detected, it will be necessary to alert some other nodes in the ATM network of the failure of all VPs that are related to the alarm. To initiate such an alert, the ALM detector 11 sends an AIM detection signal to an address counter 12 and an entry data memory 14. Upon receipt of the ALM detection signal, the address counter 12 quickly generates a sequence of integer numbers which has the same bit length as that of the VPI/VCI of ATM cells. The address counter 12 sends such sequential numbers, from zero to the maximum number (i.e., 111 . . . 111) within the range, to the selector 13. Those sequential numbers serves as address values for the entry data memory 14 as will be clarified later. While the physical layer alarm is processed, the selector 13 selects those sequential address values generated by the address counter 12 and supplies them to the entry data memory 14 and a VPI information sender 15.

The entry data memory 14 stores VPIs/VCIs corresponding to the subscriber premises in a special way. That is, the address of the entry data memory 14 has the same bit length as that of the VPIs/VCIs, allowing all possible VPI/VCI values to be directly mapped onto the address values. A value "1" is stored in the addresses corresponding to the VPIs/VCIs that are registered, while a value "0" is stored in the remaining addresses corresponding to non-registered VPIs/VCIs. Those values are referred to as the registration entry data.

Driven by the output of the address counter 12 via the selector 13, as well as being triggered by the ALM detection signal, the entry data memory 14 outputs 1s and 0s to the VPI information sender 15 according to the registration entry data stored therein. It should be recalled here that the VPI information sender 15 is supplied the sequential address values from the address counter 12. The VPI information sender 15 uses the output of the entry data memory 14 as the qualifier to extract some of the sequential address values. More specifically, the VPI information sender 15 accepts the entered address values only when the entry data memory 14 indicates the corresponding registration entry value "1". As a result, the VPI information sender 15 acquires all the VPI/VCI values that have been registered beforehand as the connection identifiers which lead ATM cells to the subscriber premises. The VPI information sender 15 further extracts the VPIs from among the acquired VPI/VCI values and sends them to a VP-AIS cell generator 16.

In the way described above, all the registered VPIs relevant to the subscriber premises are retrieved and supplied to the VP-AIS cell generator 16 in response to the physical layer alarm detected. The VP-AIS cell generator 16 creates VP-AIS cells for all the VPIs received from the VPI information sender 15. The created VP-AIS cells are then inserted to the cell stream by a VP-AIS cell insertion unit 18, via a buffer 17 prepared as temporary storage to adjust transmission timings. In problem situations where the system is facing a physical layer alarm, the VP-AIS cells will be able to smoothly flow into the stream because of the absence of valid cell traffic.

In normal situations where no physical layer alarm is detected, the SONET synchronous frames entered to the OAM processing device are directed to the SONET/ATM converter 19 to extract a plurality of ATM cells contained in the logical payload envelope of a SONET frame. The extracted ATM cells are then applied to a VPI/VCI extractor 20, where the VPI/VCI field of each ATM cell is extracted for use in the selector 13.

When no physical layer alarm is present, the selector 13 selects the signal from the VPI/VCI extractor 20. This means that the selector 13 provides the entry data memory 14 with the extracted VPI/VCI to drive its address input lines. The entry data memory 14 thus outputs the registered entry data corresponding to the given address, or the extracted VPI/VCI number, and this data is supplied to an entry data flag generator 22. The entry data flag generator 22 produces a VPI/VCI coincidence flag for the present ATM cell in process, only when the entry data memory 14 indicates the value "1" as the registration entry data. Note that this operation of the entry data memory 14 is equivalent to malting a comparison between the extracted VPI/VCI and the registered VPI/VCI records as described earlier. The present 53-byte ATM cell subjected to the above-described VPI/VCI comparison is then sent to a buffer 21 for the purpose of transmission timing adjustment, and finally supplied to the AIS cell insertion unit 18, along with a single-bit VPI/VCI coincidence flag produced by the entry data flag generator 22.

As described above, the entry data memory 14 stores the previously registered VPIs/VCIs and performs VPI/VCI comparison as well as handling the physical layer alarms. That is, the entry data memory 14 plays two different roles depending on the situation unlike the conventional OAM processing devices. This simplified circuit configuration leads to a scaled-down OAM processing device that is small in size and consumes less power than the conventional OAM processing devices.

The relationship between the basic elements of the present invention as depicted in FIG. 1 and the elements shown in FIG. 2 is as follows. The extraction means 1 in FIG. 1 directly corresponds to the VPI/VCI extractor 20 in FIG. 2. Also, the alarm detection means 2 is FIG. 1 directly corresponds to the ALM detector 11. The output means 3 in FIG. 1 is implemented as a combination of the entry data memory 14, selector 13, and VPI information sender 15, as indicated by a broken line 3a. The VP-AIS cell output means 4 is realized as a circuit block indicated by another broken line 4a, which includes the VP-AIS cell 16, buffer 17, and VP-AIS cell insertion unit 18.

Figure 3:
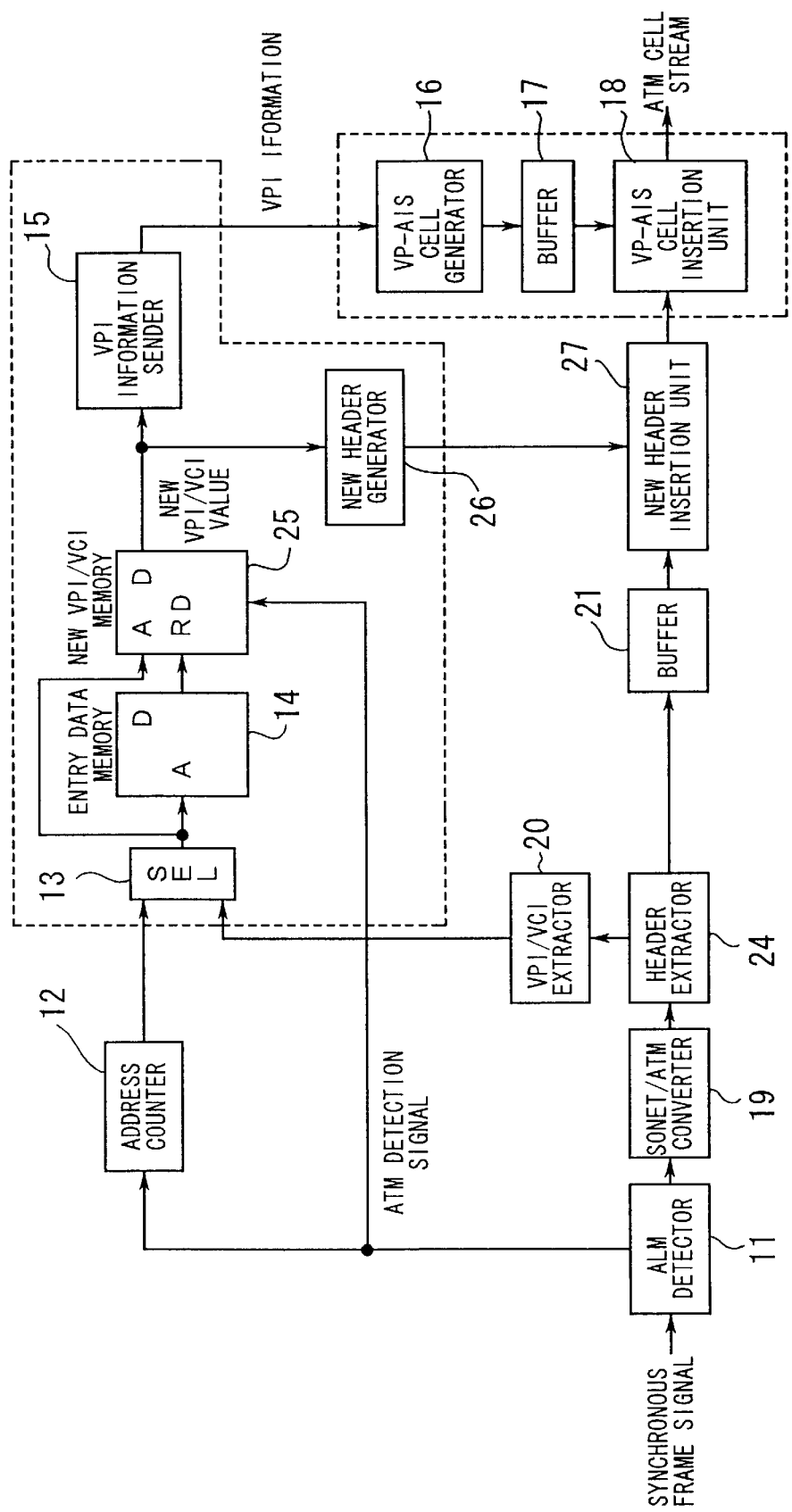
FIG. 3 is a block diagram showing the structure of a second embodiment of the present invention.

With reference to FIG. 3, a second embodiment of the present invention will be explained below. This second embodiment is related particularly to the case that the network element where the OAM processing device is located has ATM switching functions.

FIG. 3 is a block diagram showing the detailed structure of the second embodiment of the present invention. Since the second embodiment has basically the same structure as that of the first embodiment, the following description will focus on the distinctive points while affixing like reference numerals to like elements. More specifically, the second embodiment differs from the first embodiment in that it employs a header extractor 24, a new VPI/VCI memory 25, a new header generator 26, and a new header insertion unit 27 for header conversion purposes.

The header extractor 24 extracts the header of each incoming ATM cell and sends the extracted header information to the VPI/VCI extractor 20, as well as forwarding the entire ATM cell to the buffer 21. Being addressed by the VPI/VCI value, the new VPI/VCI memory 25 outputs a new VPI/VCI which has been registered beforehand for use in the ATM switching operation. Each time a new ATM cell is entered, the OAM processing device examines whether the VPI/VCI of the ATM cell is among those registered or not by referring to the entry data memory 14. This entry data memory 14 outputs the registration entry value "1" for the registered VPIs/VCIs, enabling the new VPI/VCI memory 25 to output a new VPI//VCI value that is translated, or switched, from the present VPI/VCI. The new VPI/VCI obtained as such is provided to the new header generator 26.

Based on the new VPI/VCI, the new header generator 26 constructs a new header for the present ATM cell which is now held in the buffer 21. Subsequently, the new header insertion unit 27 replaces the present header of the ATM cell with the newly constructed header.

In the case of handling a physical layer alarm, the VPI information sender 15 receives new VPIs/VCIs translated by the new VPI/VCI memory 25. Out of those new VPIs/VCIs, the VPI information sender 15 extracts new VPIs for use in the VP-AIS cell generation.

To summarize the second embodiment, the entry data memory 14 stores all the VPIs/VCIs previously registered and performs VPI/VCI comparison for normal ATM cells entered to the OAM processing device, as well as handling physical layer alarms by generating all the relevant VPIs. Furthermore, the new VPI/VCI memory 25, which stores new VPIs/VCIs for ATM switching operations, performs a VPI/VCI conversion from the present VPIs/VCIs to the new VPIs/VCIs, not only for normal ATM cells but also for the VPIs/VCIs relevant to the physical layer alarms, if happened. That is, the entry data memory 14 and new VPI/VCI memory 25 play two different roles depending on the situation, and this simplified circuit configuration will contribute to the miniaturization and power reduction of the OAM processing device.

Figure 4:
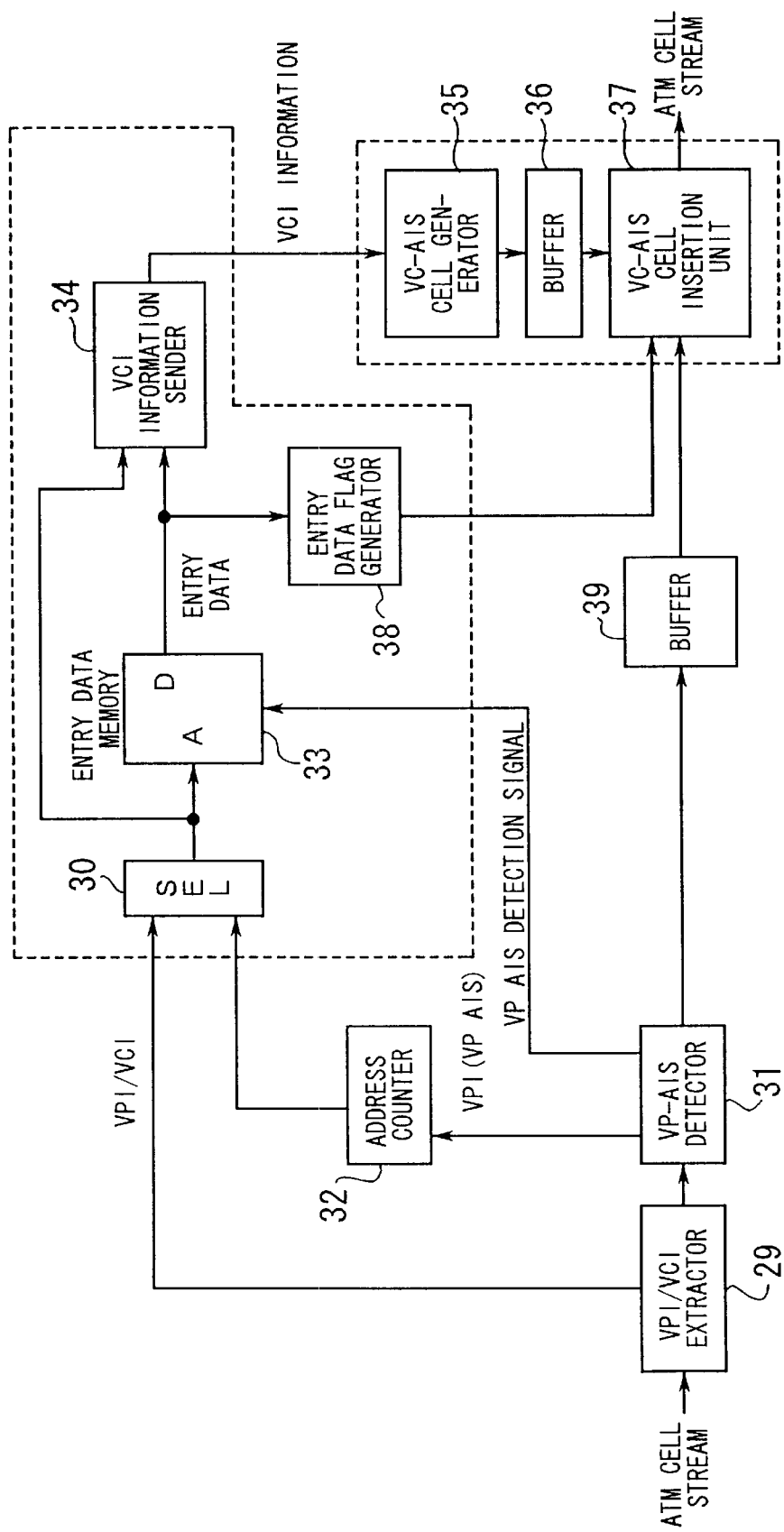
FIG. 4 is a block diagram showing the structure of a third embodiment of the present invention.

Referring next to FIG. 4, a third embodiment of the present invention will be explained below. This third embodiment is related particularly to an OAM processing device which produces Virtual Connection-Alarm Indication Signal (VC-AIS) cells based on an error detected in a Virtual Path Connection (VPC).

FIG. 4 is a block diagram showing the structure of the third embodiment of the present invention. It is assumed that a switching system is connected at the left end of this block diagram, and a plurality of subscriber premises at the right end. An ATM cell stream from the switching system are processed in this OAM processing device and output to the subscribers. A VPI/VCI extractor 29 extracts the VPI/VCI of each ATM cell and provides it to a selector 30. A VP-AIS detector 31, disposed next to the VPI/VCI extractor 29, monitors the ATM cell stream to detect a VP-AIS cell that indicates some failure of a particular VP. When such a VP-AIS cell is detected, it is necessary to alert other entities in the network of the virtual path failure, which means that all VCs belonging to the failed VP have lost their functionality. That is, upon detection of a VP-AIS cell, the VP-AIS detector 31 sends the VPI indicated in the detected VP-AIS cell to an address counter 32, as well as outputting a VP-AIS detection signal to trigger the operation of an entry data memory 33. In response to this indication of the VPI number from the AIS detector 31, the address counter 32 quickly generates a sequence of integer numbers, from zero to the maximum number that can be expressed in binary digits as many as that of the VCI field of an ATM cell. The address counter 32 combines those generated numbers with the VPI number indicated by the AIS detector 31, assigning the former to lower digits and the latter to upper digits. As a result, a set of sequential address values is formed. While the VP-AIS is processed, the selector 30 selects those sequential address values sent from the address counter 32 and supplies them to the entry data memory 33 and a VCI information sender 34.

The entry data memory 33 stores VPIs/VCIs corresponding to the subscriber premises in a special way. More specifically, the address of the entry data memory 33 has the same bit length as that of the VPIs/VCIs, allowing all possible VPI/VCI values to be directly mapped onto the address values. The contents of the entry data memory 33 show registration entry status of the individual VPIs/VCIs. The entry data memory 33 outputs a value "1" for the addresses corresponding to the registered VPIs/VCIs, while outputting a value "0" for non-registered VPIs/VCIs. Addressed by the output of the address counter 32 via the selector 30, as well as being triggered by the ALM detection signal, the entry data memory 33 supplies a VCI information sender 34 with its data output, 1 or 0, representing the registration entry status. The VCI information sender 34 uses this output of the entry data memory 33 as the qualifier to choose the relevant VPIs/VCIs from among the sequential address values received from the address counter 32 via the selector 30. More specifically, the VCI information sender 34 accepts the entered address values only when the entry data memory 33 indicates the registration entry value "1." As a result, the upper-digit value of the accepted address values equals the VPI indicated in the VP-AIS cell, while the lower-digit values include all the registered VCIs corresponding to the subscriber premises connected to the present network element. The VCI information sender 34 sends those VPI/VCI values to a VC-AIS cell generator 35. In the way described above, all the relevant VPI/VCI values of VCs belonging to the failed VP are supplied to the AIS cell generator 35 in response to the detection of a VP-AIS cell.

The VC-AIS cell generator 35 creates VC-AIS cells for all the VPI/VCI values received from the VCI information sender 34. The created VC-AIS cells are temporarily stored in a buffer 36 and then inserted into the cell stream by a VC-AIS cell insertion unit 37. In the present embodiment, idle cells in the ATM cell stream can be easily identified by monitoring the output of the entry data memory 33. That is, if the entry data memory 33 outputs the value "0," the present ATM cell in process is an idle cell. With this indication of idle cells, the AIS cell insertion unit 37 will simply put the VC-AIS cells in place of those idle cells identified. As such, the present invention eliminates a detector circuit to find idle cells in an ATM cell stream, whereas conventional OAM processing devices require this circuit.

When, in turn, no VP-AIS cell is present, the selector 30 selects VPIs/VCIs supplied from the VPI/VCI extractor 29 to provide the entry data memory 33 with them as the address signals. Therefore, the entry data memory 33 outputs the registration entry data corresponding to the extracted VPIs/VCIs, and the data is supplied to an entry data flag generator 38. The entry data flag generator 38 produces a VPI/VCI coincidence flag for the present ATM cell in process only when the entry data memory 33 outputs the value "1" of the registration entry data. In other words, only when the VPI/VCI extracted from the present ATM cell coincides with one of the registered VPIs/VCIs, the VPI/VCI coincidence flag is set and attached to the present ATM cell. The present 53-byte ATM cell subjected to the above-described VPI/VCI examination is then sent to a buffer 39 for the purpose of transmission timing adjustment, and finally supplied to the VC-AIS cell insertion unit 37, along with the single-bit VPI/VCI coincidence flag produced in the entry data flag generator 34.

As described above, the entry data memory 33 serves as storage of registered VPIs/VCIs to examine VPI/VCI values of incoming ATM cells and also to handle VP-AIS alarms. That is, the entry data memory 33 plays two different roles depending on the situation, and this simplified circuit configuration will contribute to the miniaturization and power reduction of the OAM processing device.

Figure 5:
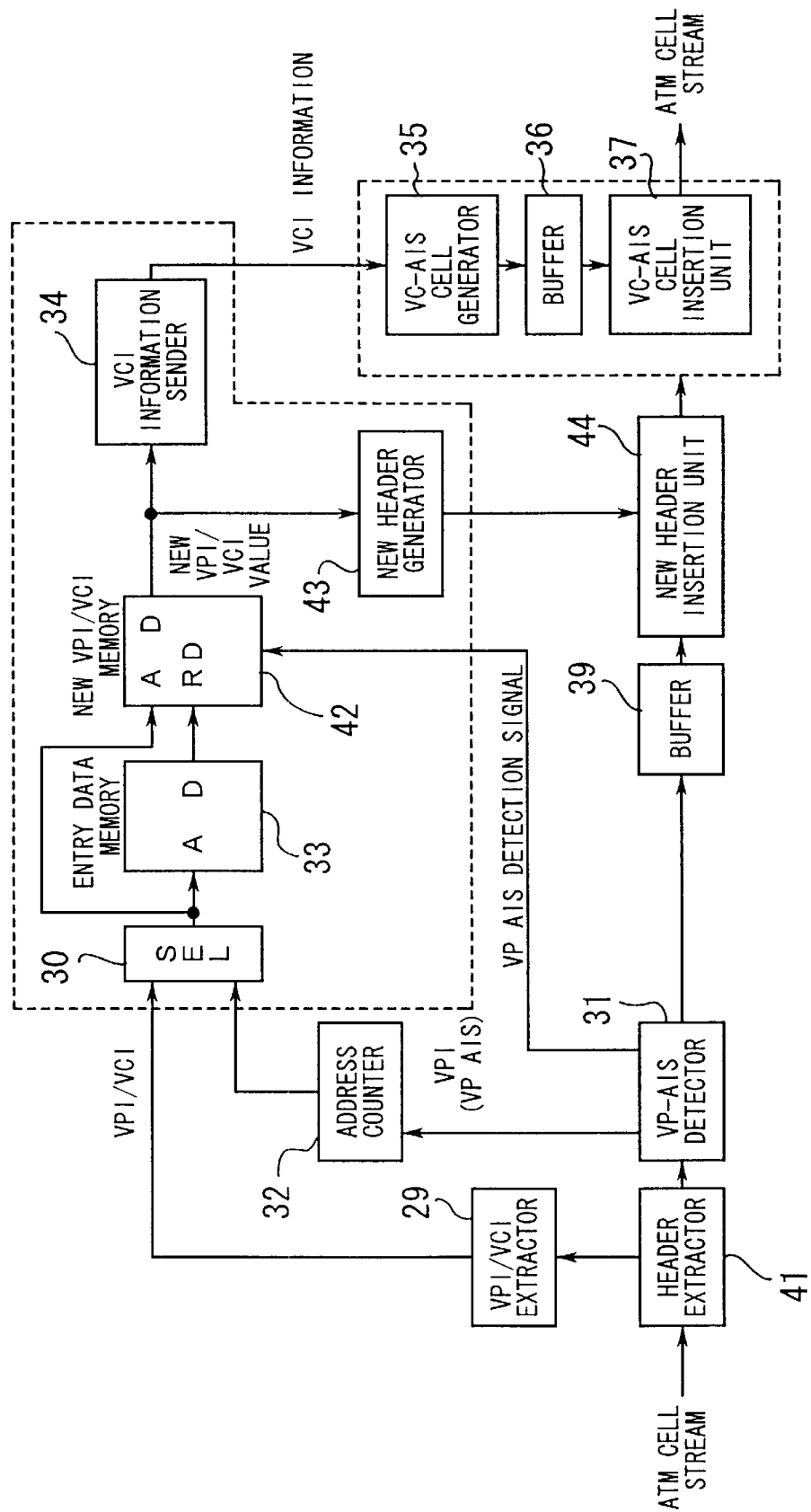
FIG. 5 is a block diagram showing the structure of a fourth embodiment of the present invention.

Referring next to FIG. 5, a fourth embodiment of the present invention will be explained below. This fourth embodiment is related particularly to the case that the network element where the OAM processing device is located has ATM switching functions.

FIG. 5 is a block diagram showing the structure of the fourth embodiment of the present invention. Since the fourth embodiment has basically the same structure as that of the third embodiment, the following description will focus on the distinctive points while affixing like reference numerals to like elements. More specifically, the fourth embodiment differs from the third embodiment in that it employs a header extractor 41, a new VPI/VCI memory 42, a new header generator 43, and a new header insertion unit 44 for header conversion purposes.

The header extractor 41 extracts header information from each incoming ATM cell and sends the extracted header information to the VPI/VCI extractor 29 through the VP-AIS detector 31, as well as forwarding the entire ATM cells to the buffer 39. Being addressed by the VPI/VCI values, the new VPI/VCI memory 42 outputs new VPIs/VCIs which have been registered beforehand for use in the ATM switching operation. Each time a new ATM cell is entered, this OAM processing device examines whether the VPI/VCI of the ATM cell is among those registered or not, by referring to the entry data memory 33. This entry data memory 33 outputs the registration entry data "1" for the registered VPIs/VCIs, enabling the new VPI/VCI memory 42 to output a new VPI/VCI value translated from the present VPI/VCI value which is supplied thereto as the address signals from the selector 30. The new VPI/VCI obtained as such is provided to the new header generator 43.

Based on the new VPI/VCI received, the new header generator 43 constructs a new header for the present ATM cell in process. The new header insertion unit 43 replaces the present header of the ATM cell with the newly constructed header.

The new VPI/VCI memory 42 also serves for the case of handling a VP-AIS cell. That is, the VCI information sender 34 receives the switched new VPIs/VCIs from the new VPI/VCI memory 42 and outputs them for use in the AIS cell generator 35 to generate VC-AIS cells.

To summarize the fourth embodiment, the entry data memory 33 stores all the VPIs/VCIs previously registered and performs VPI/VCI comparison for normal ATM cells entered to the OAM processing device, as well as handling a VP-AIS cell by generating all the relevant VPIs and VCIs. Furthermore, the new VPI/VCI memory 42, which stores new VPIs/VCIs for ATM switching operations, performs conversion from the present VPIs/VCIs to new VPIs/VCIs, not only for switching normal ATM cells but also for generating VPIs/VCIs relevant to a VP-AIS cell if it is received. As such, the entry data memory 33 and new VPI/VCI memory 42 play some different roles depending on the situation, and this simplified circuit configuration will contribute to the miniaturization and power reduction of the OAM processing device.

Figure 6:
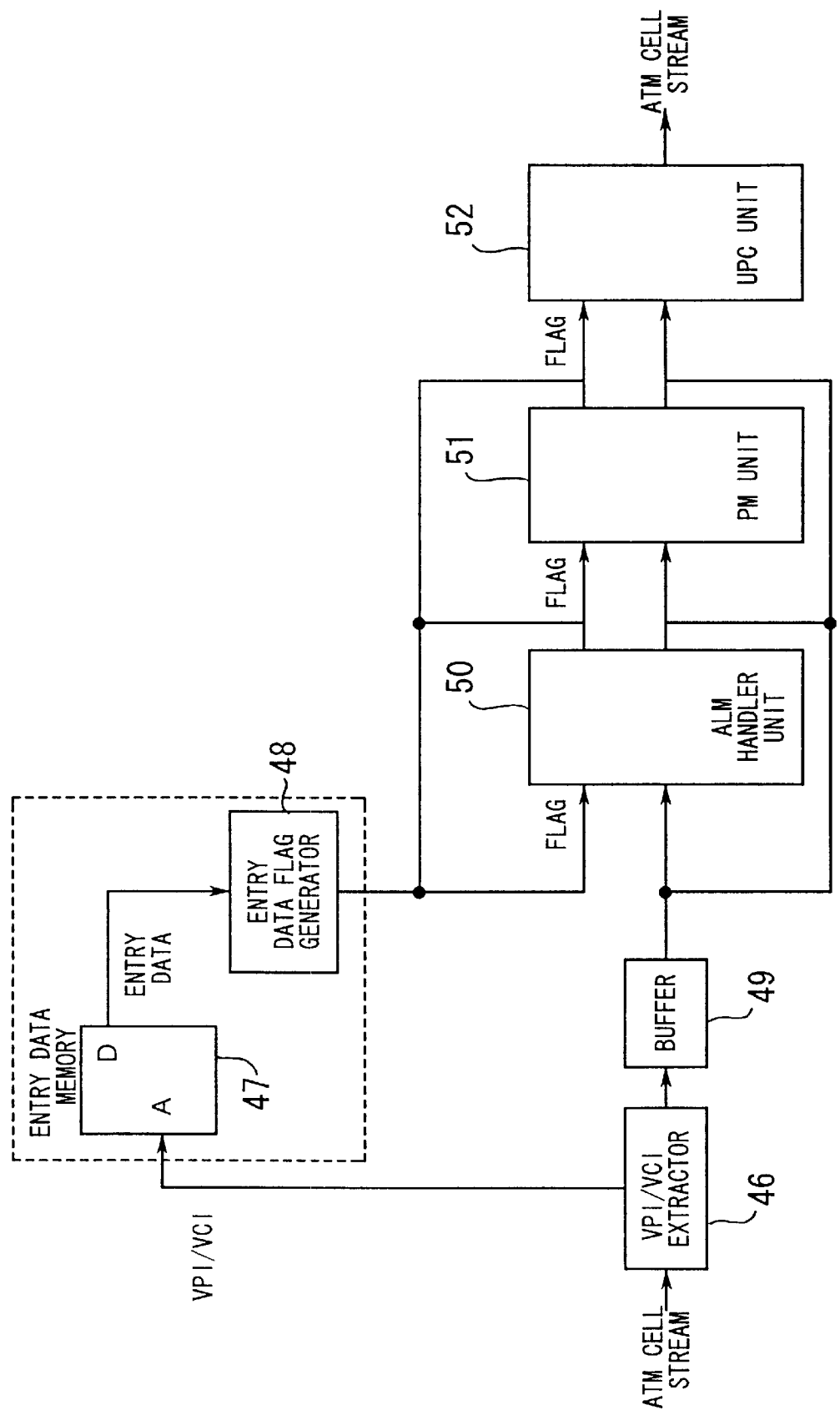
FIG. 6 is a block diagram showing the structure of a fifth embodiment of the present invention.

Referring next to FIG. 6, a fifth embodiment of the present invention will be explained below. This fifth embodiment is related to three parts constituting an OAM processing device: alarm processor unit, performance monitor (PM) unit, and usage parameter control (UPC) unit.

FIG. 6 is a block diagram showing the structure of the fifth embodiment of the present invention. It is assumed here that a switching system is connected at the left end of this block diagram, while a plurality of subscriber premises at the right end. The incoming ATM cell stream from the switching system are processed in this OAM processing device and output to the subscribers. A VPI/VCI extractor 46 extracts the VPI/VCI of each incoming ATM cell and provides it to an entry data memory 47. The entry data memory 47 stores VPIs/VCIs allocated to the subscriber premises. More specifically, the address of the entry data memory 47 has the same bit length as that of the VPIs/VCIs, allowing all possible VPI/VCI values to be directly mapped onto the address values. The data contents of the entry data memory 47 show the registration status of the individual VPI/VCI values; the entry data memory 47 contains the data "1" for addresses corresponding to the registered VPIs/VCIs and "0" for non-registered VPIs/VCIs. The entry data memory 47 outputs such registration entry data corresponding to a given address value, or the VPI/VCI extracted out of the present ATM cell in process. The registration entry data is then supplied to an entry data flag generator 48. The entry data flag generator 48 produces a VPI/VCI coincidence flag for the present ATM cell only when the entry data memory 47 outputs the data "1," indicating that the VPI/VCI is one of the registered VPIs/VCIs used to reach the subscriber premises. The present 53-byte ATM cell, which has been subjected to the above-described VPI/VCI comparison, is then sent to a buffer 49 for transmission timing adjustment. Along with the single-bit VPI/VCI coincidence flag produced in the entry data flag generator 48, the ATM cell in the buffer 49 is delivered to an ALM handler unit 50, a PM unit 51, and a UPC unit 52.

From the VPI/VCI coincidence flag, the ALM handler unit 50 learns that the present cell's VPI/VCI is registered as one of the connection identifiers to reach the subscriber premises. Based on this knowledge, the ALM handler unit 50 handles alarm signals such as VP-AIS and VC-AIS. The performance monitor (PM) 51 measures the frequency of alarms, based on the same knowledge. Likewise, based on the same knowledge, the usage parameter control (UPC) 52 discards or tags ATM cells that will not meet some requested Quality of Service (QoS), as well as discarding ATM cells that have no VPI/VCI coincidence flags set.

As described above, the incoming ATM cells are sent to the ALM handler unit 50, PM unit 51, and UPC unit 52 and processed in those three units in parallel. Since the ATM cells are accompanied by the VPI/VCI coincidence flags that show the registration entry status of each cell's VPI/VCI, those three processing units are free from checking the VPI/VCI of each ATM cell. Unlike the conventional OAM processing devices, the fifth embodiment of the present invention avoids duplication of the VPI/VCI checking process, thereby reducing the physical circuit size and realizing power reduction.

Figure 7:
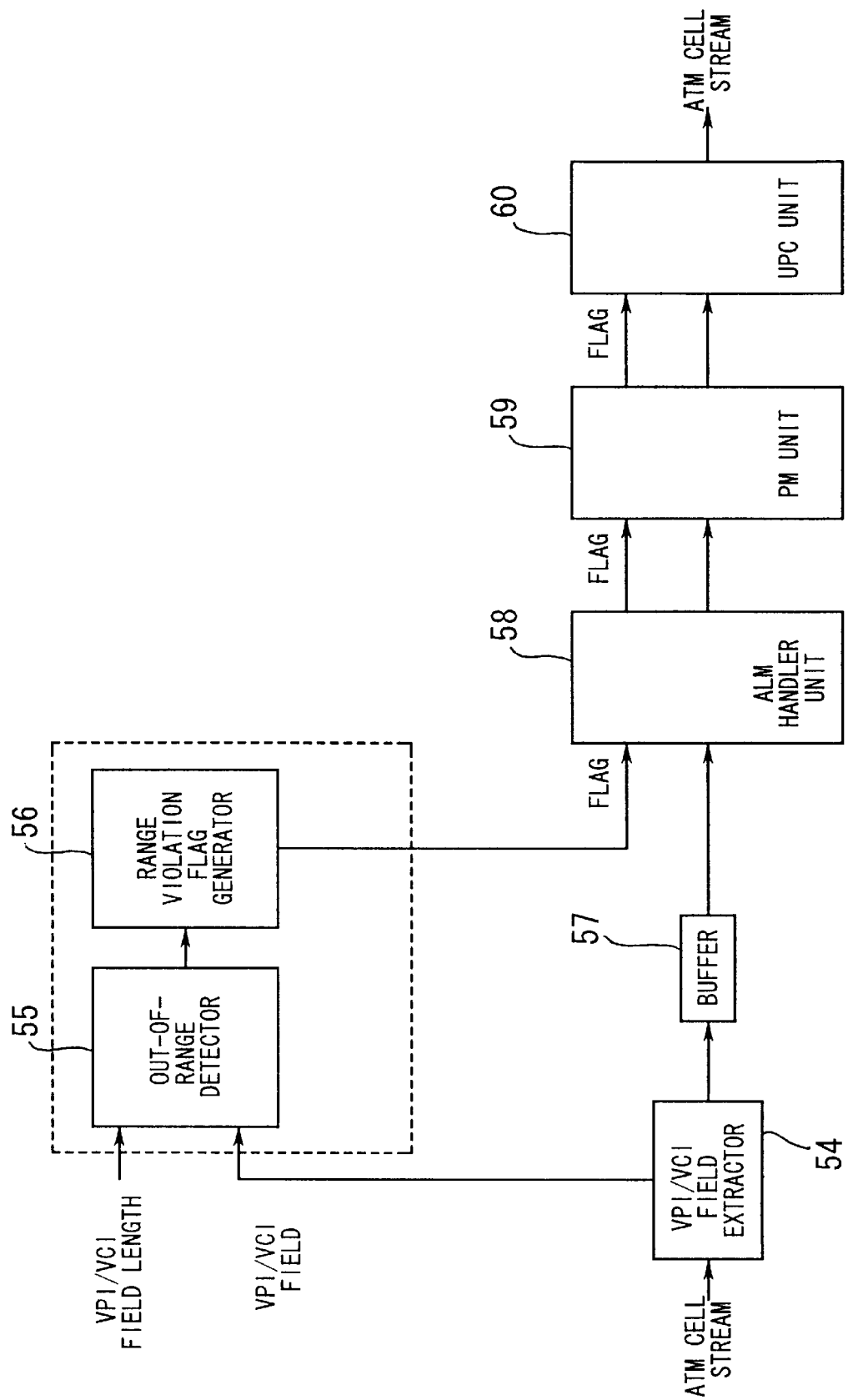
FIG. 7 is a block diagram showing the structure of a sixth embodiment of the present invention.

Referring next to FIG. 7, a sixth embodiment of the present invention will be explained below. As is the fifth embodiment, this sixth embodiment is related to the alarm processor unit, PM unit, and UPC unit as part of an OAM processing device.

FIG. 7 is a block diagram showing the structure of the sixth embodiment of the present invention. It is assumed that a switching system is connected at the left end of this block diagram, and a plurality of subscriber premises at the right end. An ATM cell stream from the switching system are processed in this OAM processing device and output to the subscribers.

A VPI/VCI field extractor 54 accepts ATM cells from the switching system, extracts their respective VPI/VCI field values, and supplies the extracted values to an out-of-range detector 55. Here, the VPI/VCI field is a 24-bit field as part of the 5-byte ATM header. In most implementations, however, the number of VPI/VCI identifiers is fewer than the possible maximum numbers that the 24-bit field length allows. If that is the case, a shorter bit field will be used to convey the limited VPIs/VCIs. This shortened VPI/VCI field determines the actual VPI/VCI range. The out-of-range detector 55 receives the definition of the VPI/VCI range from an external source, while being supplied with the VPI/VCI field from the VPI/VCI field extractor 54. The out-of-range detector 55 examines whether the supplied VPI/VCI value is within the limited VPI/VCI range set by the external source. If the VPI/VCI value is not within the range, the out-of-range detector 55 makes a range violation flag generator 56 produce an alarm flag to indicate that the VPI/VCI is out of the predetermined range; this flag is referred to as a range violation flag. The present 53-byte ATM cell, which has been subjected to the above-described VPI/VCI range examination, is once sent to a buffer 57 for timing adjustment, and then supplied to an ALM handler unit 58, PM unit 59, and UPC unit 60, along with the single-bit range violation flag produced in the range violation flag generator 56.

From the range violation flag supplied, the ALM handler unit 58 learns that the present cell's VPI/VCI of the incoming ATM cells is out of the predetermined range, and based on this knowledge, it handles alarm signals such as VP-AIS and VC-AIS. Also, the performance monitor (PM) 59 measures the frequencies of alarms, based on the same knowledge. Likewise, according to the knowledge of the out-of-range status, the usage parameter control (UPC) 60 will discard or tag ATM cells that do not meet the requested Quality of Service (QoS).

As described above, the incoming ATM cells are sent to the ALM handler unit 58, PM unit 59, and UPC unit 60, while their VPI/VCI are examined in terms of the range constraint. Since those ATM cells are accompanied by the range violation flags that indicate a range fault of each cell's VPI/VCI, those three processing units need not to individually check the VPI/VCI of incoming ATM cells. Unlike the conventional OAM processing devices, the sixth embodiment of the present invention avoids duplication of the VPI/VCI range checking process in the ALM handler unit 58, PM unit 59, and UPC unit 60. This simplified circuit configuration allows the OAM processing device to be smaller in size and less power-consuming.

Figure 8:
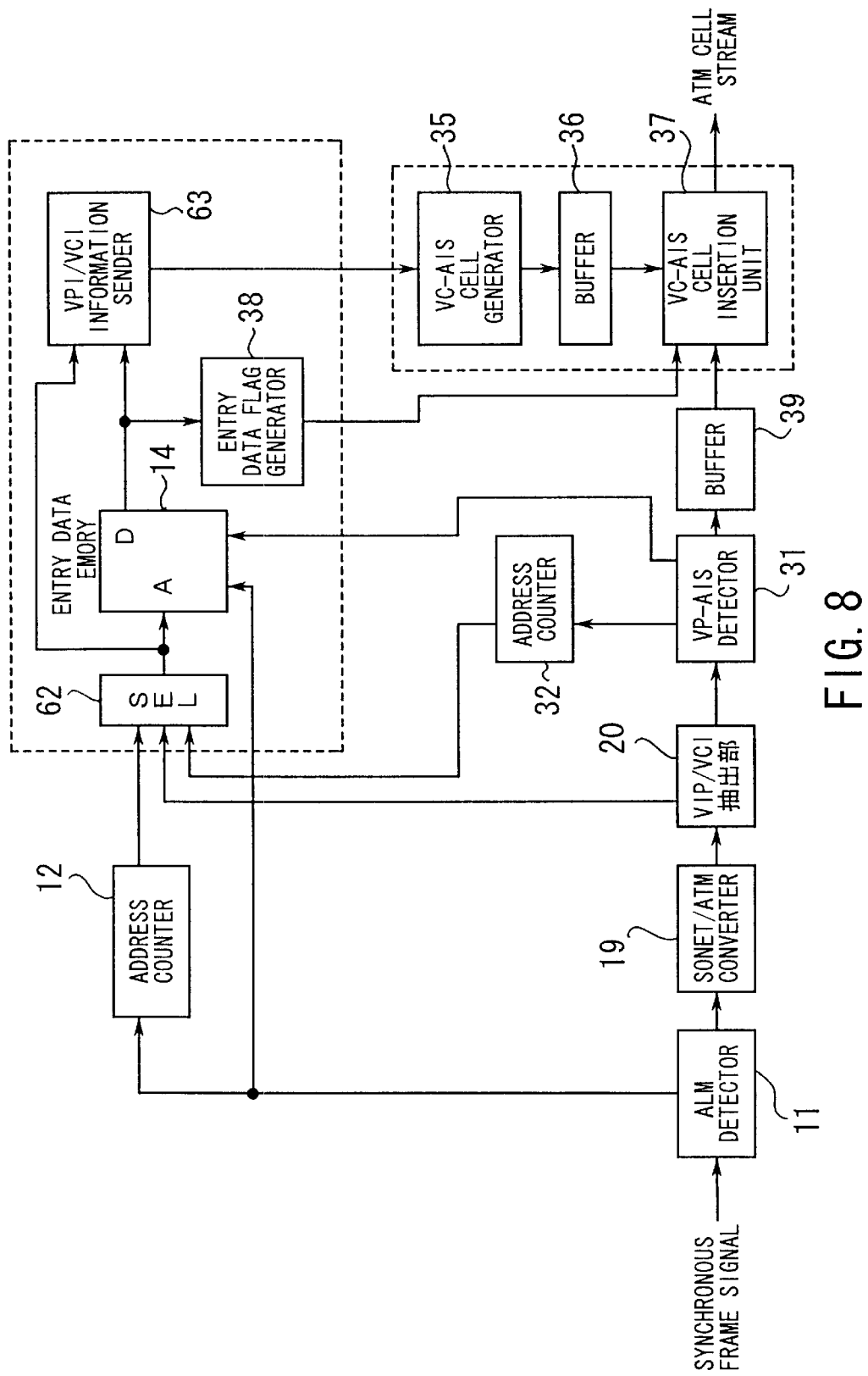
FIG. 8 is a block diagram showing the structure of a seventh embodiment of the present invention.

Referring next to FIG. 8, a seventh embodiment of the present invention will be explained below.

FIG. 8 is a block diagram showing the structure of the seventh embodiment. Since this seventh embodiment is actually a combination of the first embodiment (FIG. 2) and the third embodiment (FIG. 4). The following description will focus on the distinctive points in the eighth embodiment, while affixing like reference numerals to like elements.

More specifically, the seventh embodiment differs from the first embodiment and third embodiment in the structure of a selector 62 and a VPI/VCI information sender 63. The selector 62 is a 3-to-1 multiplexer, which will selectively output either of:

(1) sequential address values generated by the first address counter 12 when a physical layer alarm is detected;

(2) VPI/VCI value extracted by the VPI/VCI extractor 20 when no alarm is detected; and (3) sequential address values (with a fixed VPI) generated by the second address counter 32 when a VP-AIS cell is received.

During the process of handling a physical layer alarm, a VPI/VCI information sender 63 accepts the sequential address values provided by the selector 62 only when the entry data memory 14 indicates the registration entry value "1". The accepted address values are the values of VPIs/VCIs which have been registered as the connection identifiers for the subscriber premises. The VPI/VCI information sender 63 sends those VPIs/VCIs to the VC-AIS cell generator 35. In this way, the physical layer alarm causes the entire set of the registered VPIs/VCIs to be delivered to the AIS cell generator 35. Those VPIs/VCIs include all identifiers of VCs that belong to VPs affected by the physical layer alarm.

The VC-AIS cell generator 35 creates VC-AIS cells for all the VPI/VCI values received from the VCI information sender 63. The created VC-AIS cells are temporarily stored in a buffer 36 and then inserted into the cell stream by a VC-AIS cell insertion unit 37. In such situations where the system is facing a physical layer alarm, the VP-AIS cells can simply flow into the stream at any time because of the absence of valid cell traffic in the network.

In another kind of problem situation where a VP-AIS is present, the VPI/VCI information sender 63 uses the output of the entry data memory 14 as the qualifier to choose some relevant VPIs/VCIs from among the sequential address values received from the address counter 32 via the selector 62. More specifically, the VPI/VCI information sender 63 accepts the address values (i.e., VPI/VCI values) only when the entry data memory 14 indicates "1" as the registration entry value. Here, each accepted address value consists of two parts: the fixed high-order bits equal to the VPI value indicated in the VP-AIS cell, and the low-order bits including all the registered VCI values corresponding to the subscriber premises connected to the present network element. The VPI/VCI information sender 63 sends such VPI/VCI values to the AIS cell generator 35. As such, the entire set of VPI/VCI values relevant to the VCs that belong to the failed VP will be supplied to the AIS cell generator 35 in response to the detection of a VP-AIS cell.

The VC-AIS cell generator 35 creates VC-AIS cells for the respective VPI/VCI values received from the VPI/VCI information sender 63. The created VC-AIS cells are temporarily stored in a buffer 36 and then inserted into the current cell stream by the VC-AIS cell insertion unit 37. Since the idle cells in the ATM cell stream can be identified simply by watching the output of the entry data memory 14, the AIS cell insertion unit 37 will only have to put the VC-AIS cells in place of those idle cells identified. That is, the present invention eliminates a circuit to detect idle cells in the stream, whereas conventional OAM processing devices require such a circuit.

Lastly, an eighth embodiment of the present invention will be explained below, with reference to FIG. 9. This eighth embodiment is particularly related to a PM unit in an OAM processing device.

Figure 9:
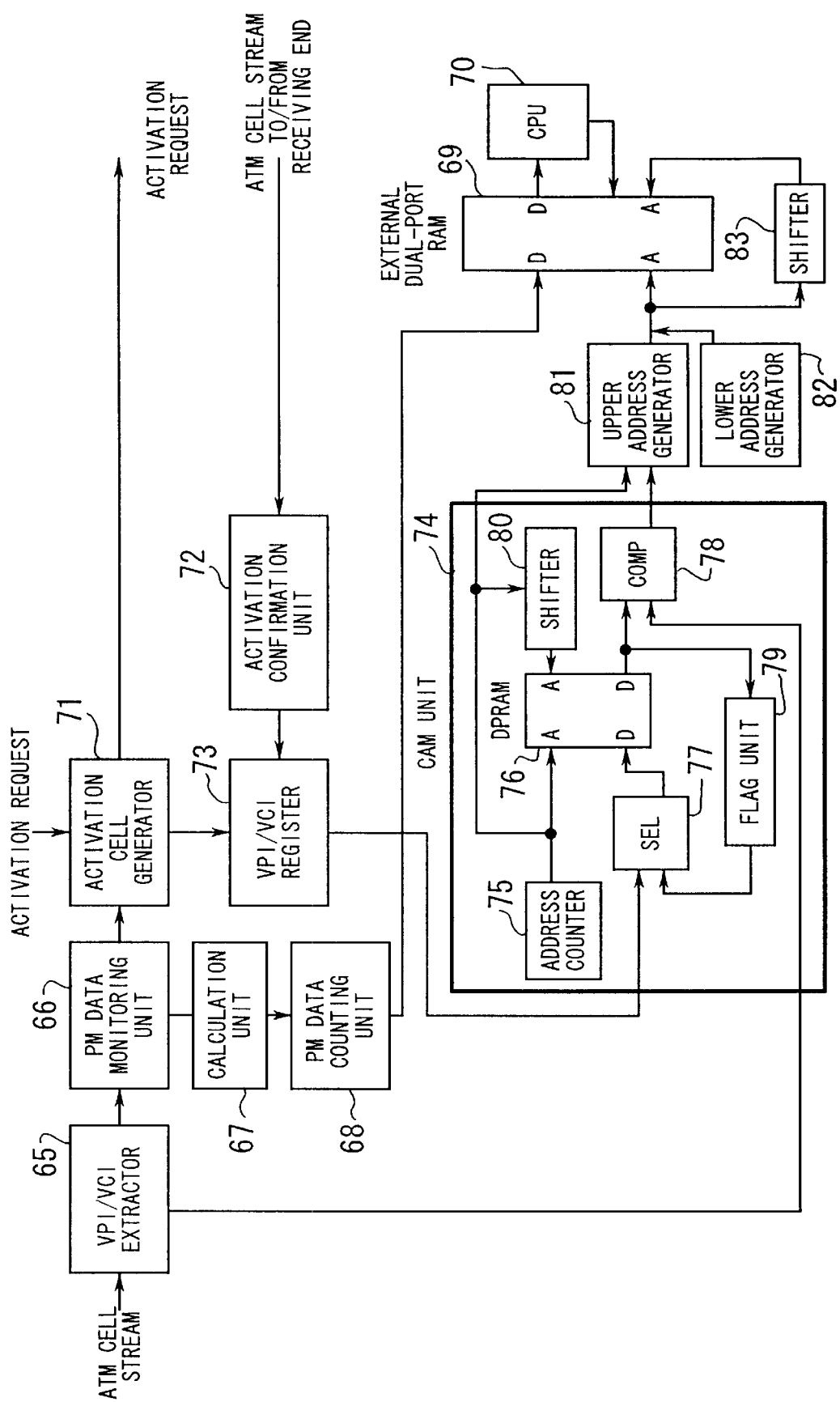
FIG. 9 is a block diagram showing the structure of an eighth embodiment of the present invention.
Figure 10:
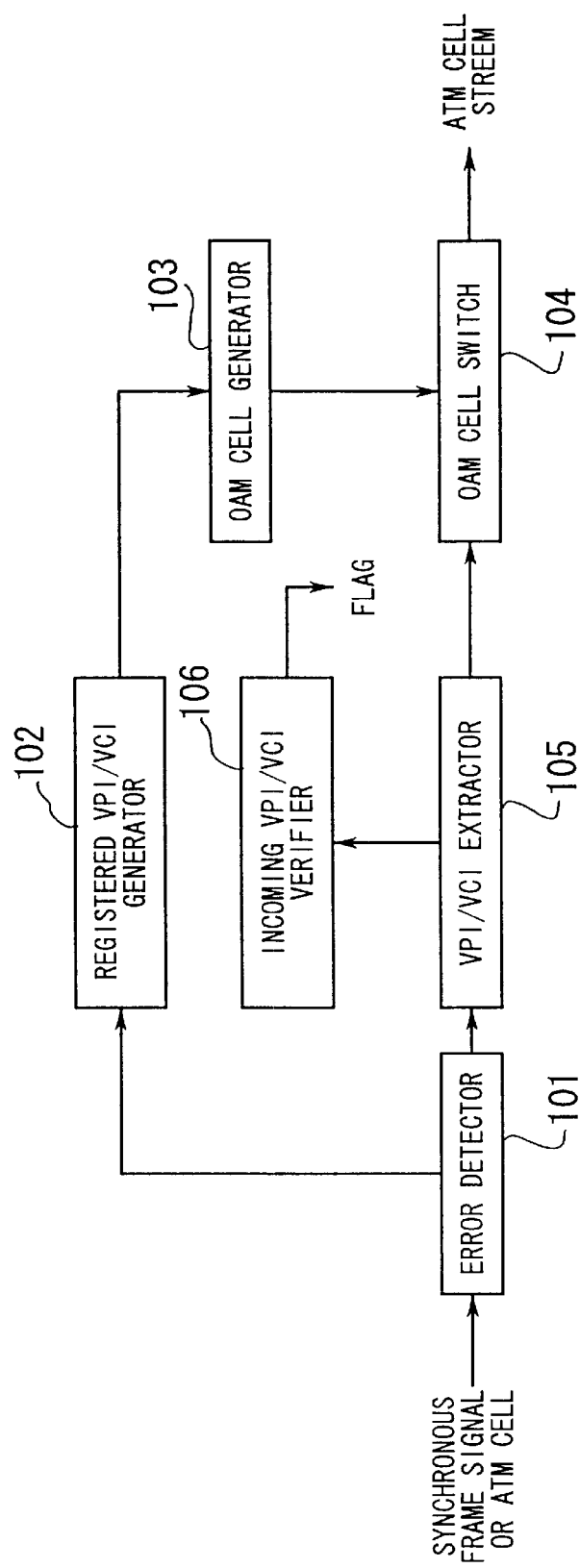
FIG. 10 is a block diagram that shows a part of a conventional OAM processing device.

FIG. 9 is a block diagram showing the structure of the eighth embodiment of the present invention, where an ATM cell stream is entered at the left end of the diagram. The ATM cells in this stream are accompanied by VPI/VCI coincidence flags generated by the entry data memory and range violation flags indicative of the out-of-range error of VPI/VCI values. The VPI/VCI extractor 65 finds a PM cell from among the cells in the stream and extracts the VPI/VCI of the PM cell if it is found. The PM cell is one of the OAM cells used in performance management. The types of OAM cells can be resolved by examining the OAM cell type field as part of the 48-byte payload of OAM cells. The OAM cells are ATM cells used for the ATM layer control, which reserve some special VCI values and Payload Type (PT) values to distinguish themselves from others. The payload field of the PM cells is used to convey the number of user data cells transferred between two OAM cells inserted, error detection code, and the like. These kinds of payload data will serve for measurement of block error rate, cell loss ratio, and cell misinsertion rate of user data cells.

In a cell loss test, for example, the source node inserts a PM cell every time a predetermined number of user data cells are transmitted, which allows the destination node to investigate how many cells are lost during the travel along a given end-to-end connection. Although the intervals of PM cell transmission may actually deviate, each PM cell carries the exact number of user data cells transmitted in the previous interval to make precise measurement possible.

In FIG. 9, a PM data monitoring unit 66 monitors the behavior of incoming PM cells and indicates the reception of PM cells to a calculation unit 67.

The calculation unit 67 performs calculations necessary for the performance monitoring operations concerning the user data cells transmitted during the time slot (hereafter, called "PM block") between two consecutive PM cells. Here, the calculation will cover a wide variety of monitoring items, and it must be performed separately for each VP/VC channel and for each PM block. For example, the calculation unit 67 calculates, for individual VP/VC channels, the number of incoming user data cells that arrived within each PM block.

The calculation unit 67 passes all the results of the calculations to a PM data counting unit 68 for summarization. For each VP/VC channel, the PM data counting unit 68 sums up the data collected along the time-axis, or the passage of PM blocks. More specifically, the PM data counter 68 has many counters corresponding to the individual VP/VC channels so that they will accumulate the calculation results obtained at every PM block interval. A processor (CPU) 70 is one of the main components of the system controller (not shown) which controls various operations and maintenance activities. The CPU 70 issues a data polling request at predetermined intervals, and in response to this request, the PM data counting unit 68 transfers the summarized data to an external dual-port RAM 69. The data contains the records of various items monitored for each VP/VC channel, which are now accessible to the CPU 70 via the external dual-port RAM 69 serving as temporary storage. The detailed explanation about the addressing method to read and write the external dual-port RAM 69 will be described later.

As opposed to the conventional OAM processing devices, the external dual-port RAM 69 in the present invention only has to store such summary data that have been processed for individual VP/VC channels. This configuration greatly reduces the required memory capacity, compared with a conventional configuration where the memory must keep not only the data for all VP/VC channels but also for all PM blocks.

The CPU 70 outputs the data polling request at appropriate intervals, considering the time required for data transfer from the PM data counting unit 68 to the external dual-port RAM 69. According to the conventional arrangements, the CPU 70 must collect all the PM block data and sum up them for individual VPIs/VCIs. In contrast to that, the CPU 70 in the present invention retrieves data from the external dual-port RAM 69 and sends them to the system controller without performing any further calculation. As a result, the CPU 70 will be able to support more VP/VC channels.

Meanwhile, the source node is required to use a special protocol before transmitting a PM cell to the destination node. That is, the source node will send an activation cell to the destination node and wait for an activation acknowledgment cell before starting PM cell transmission. The activation cell is an OAM cell for the sender (i.e., an ATM node initiating performance monitoring) to confirm whether the receiver (i.e., another ATM node at the other end of a connection being subjected to test) is ready for receiving PM cells or not, while the activation acknowledgment cell is another OAM cell for the receiver to answer the sender that it has accepted the request for the PM cell transmission.

The system controller requests the PM unit of FIG. 9 to activate the transmission of PM cells over a certain channel having a specific VPI/VCI. In response to this activation request, an activation cell generator 71 transmits the activation cell to the receiver node specified by the VPI/VCI. When the receiver returns an activation confirmation cell, an activation confirmation unit 72 extracts it from the cell stream, and notifies a VPI/VCI register 73 of the reception of the activation confirmation cell. The VPI/VCI register 73 holds the specified VPI/VCI until the activation confirmation cell is received, and upon receipt of the activation confirmation cell, it sends the VPI/VCI to a CAM unit 74.

The performance monitoring operations in discussion will range over a certain set of channels that were activated through the activation request-confirmation protocol described above. It should be noted that more than one channel can be activated at the same time. It is therefore necessary for the PM unit to recognize which channels are currently activated so that it will be able to examine each incoming PM cell to determine whether it has arrived through the activated channels or not. To provide such a function, the CAM unit 74 employs a dual-port RAM (DPRAM) 76 for storing VPIs/VCIs of the activated channels and a comparator (COMP) 78 for comparing the VPI/VCI of an incoming PM cell with the VPIs/VCIs stored in the dual-port RAM 76. More specifically, an address counter 75 generates sequential address values to write the dual-port RAM 76, and the same address values are used to read the dual-port RAM 76 via a shifter 80 that prevents any concurrent read and write access from happening to the same address of the dual-port RAM 76. A flag unit 79 outputs a flag signal when the VPI/VCI of any activated channel is present at the data output port of the dual-port RAM 76 so that a selector (SEL) 77 will inhibit any newly activation-requested VPI/VCI from entering to the dual-port RAM 76.

The address values generated in the CAM unit 74 are partially used for access of the external dual-port RAM 69. That is, the address values sent from the address counter 75 are set to an upper address generator 81. The comparator 78 compares each incoming PM cell's VPI/VCI extracted by the VPI/VCI extractor 65 with the VPIs/VCIs of the activated channels registered in the dual-port RAM 76. Only when the comparator 78 indicates the coincidence, the upper address generator 81 qualifies the address value sent from the address counter 75 as the upper address of the external dual-port RAM 69. On the other hand, a lower address generator 82 generates a series of sequential numbers as many as the number of PM data items subject to measurement, and it provides them to the external dual-port RAM 69 as its lower address. A shifter 83 prevents any concurrent read and write access from happening to the same address of the external dual-port RAM 69. With the circuit configuration described above, the external dual-port RAM 69 will store a set of measurement data collected for the prescribed PM data items, separately for each VPI/VCI of the activated channels.

In the PM unit illustrated in FIG. 9, the internal address signals of the CAM unit 74 are also utilized for addressing of the external dual-port RAM 69. This configuration avoids redundancy in the control circuit and makes it more compact, thus contributing to the miniaturization and power reduction of the OAM processing device.

To summarize the present invention, the output means stores a plurality of VPIs/VCIs that are previously registered and performs the VPI/VCI comparison as well as generating VPIs to handle physical layer alarms. Unlike the conventional OAM processing devices, the storage for the registered VPI/VCI records is unified in the present invention. As opposed to conventional OAM processing devices where some common functions were implemented as distributed and duplicated circuits, the present invention eliminates such redundancy to realize a highly unified configuration that makes the OAM processing device smaller both in size and power consumption.

The unified circuit configuration of the present invention also serves well for the VP-AIS handling. Here, the present invention eliminates the circuit to detect idle cells which was required in conventional OAM processing devices to insert VC-AIS cells to the ATM cell stream.

Further, the present invention allows the alarm processor, PM unit, and UPC unit to share the circuit to compare the VPI/VCI of each incoming ATM cell with registered VPIs/VCIs. The alarm processor, PM unit, and UPC unit will also use another common circuit to detect VPI/VCI range errors of incoming cells. This configuration will contribute to downsizing of OAM processing devices.

Furthermore, the PM unit according to the present invention has a PM data counting unit to reduce the memory capacity required for temporary storage of PM measurement data, thereby taking a processing load off the system controller.

Still another feature of the present invention is that the PM unit reuses its address generation circuit that stores PM data memory to drive the address inputs of another memory storing the VPIs/VCIs of activated channels. This configuration will also make the OAM processing device smaller both in size and power consumption.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An operations, administration, and maintenance (OAM) processing device, disposed in a network element on an Asynchronous Transfer Mode (ATM) network, for supporting management of operations and maintenance of the ATM network, the OAM processing device comprising:

extraction means for extracting a Virtual Path Identifier and Virtual Channel Identifier (VPI/VCI) from an incoming ATM cell;

alarm detection means for detecting a physical layer alarm in an incoming synchronization frame signal;

an entry data memory storing VPIs/VCIs that are previously registered thereto;

first output means for generating, in response to the VPI/VCI extracted by said extraction means, a VPI/VCI 1-bit coincidence signal when the extracted VPI/VCI coincides with one of the plurality of registered VPIs/VCIs stored in the entry data memory;

second output means for generating, in response to the physical layer alarm detected by said alarm detection means, Virtual Path Identifiers (VPIs) of all Virtual Paths (VPs) to be affected by the physical layer alarm, by retrieving all relevant entries out of the entry data memory;

memory sharing means for enabling said first output means and said second output means to share said entry data memory; and VP-AIS cell output means coupled to said second output means for generating a plurality of Virtual Path Alarm Indication Signal (VP-AIS) cells corresponding to the VPIs generated by said second output means.

2. An operations, administration, and maintenance (OAM) processing device, disposed in a network element on an Asynchronous Transfer Mode (ATM) network, for supporting management of operations and maintenance of the ATM network, the OAM processing device comprising;

extraction means for extracting a Virtual Path Identifier and Virtual Channel Identifier (VPI/VCI) from an incoming ATM cell;

alarm detection means for detecting a physical layer alarm in an incoming synchronization frame signal;

an entry data memory storing VPIs/VCIs that are previously registered thereto;

a conversion table, which is enabled when said entry data memory indicates that the extracted VPI/VCI is among the plurality of registered VPIs/VCIs, to convert the plurality of registered VPIs/VCIs to new VPIs/VCIs;

first output means for generating, in response to the VPI/VCI extracted by said extraction means, a new VPI/VCI 1-bit coincidence signal corresponding to the extracted VPI/VCI by using the conversion table, only when the extracted VPI/VCI coincides with one of the plurality of registered VPIs/VCIs;

second output means for generating, in response to the physical layer alarm detected by said alarm detection means, new Virtual Path Identifiers (VPIs) of all Virtual Paths (VPs) to be affected by the physical layer alarm, by retrieving all relevant VPIs out of the entry data memory and then converting the retrieved VPIs to the new VPIs by using the conversion table;

memory sharing means for enabling said first output means and said second output means to share said entry data memory; and new header replacing means coupled to said first output means for replacing a VPI/VCI field as part of a header of the incoming ATM cell with the new VPI/VCI generated by said first output means: and VP-AIS cell output means coupled to said second output means for generating and transmitting a plurality of Virtual Path Alarm Indication Signal (VP-AIS) cells corresponding to the new VPIs generated by said second output means.

3. An operations, administration, and maintenance (OAM) processing device, disposed in a network element on an Asynchronous Transfer Mode (ATM) network, for supporting management of operations and maintenance of the ATM network, the OAM processing device comprising:

extraction means for extracting a Virtual Path Identifier and Virtual Channel Identifier (VPI/VCI) from an incoming ATM cell;

alarm detection means for detecting a Virtual Path Alarm Indication Signal (VP-AIS) from the incoming ATM cell;

an entry data memory storing VPIs/VCIs that are previously registered thereto;

first output means for generating, in response to the VPI/VCI extracted by said extraction means, a VP/VCI 1-bit coincidence signal when the extracted VPI/VCI coincides with one of the plurality of registered VPIs/VCIs stored in the entry data memory;

second output means for generating, in response to the VPI-AIS detected by said alarm detection means, VPIs-VCIs of all Virtual Channels (VCs) that belong to a Virtual Path (VP) to be affected by the physical layer alarm, by retrieving all relevant entries out of the entry data memory;

memory sharing means for enabling said first output means and said second output means to share said entry data memory; and VC-AIS cell output means coupled to said first and second output means for generating and transmitting a plurality of Virtual Channel Alarm Indication signal (VC-AIS) cells corresponding to the VPIs/VCIs which are generated by said output means in response to the VP-AIS.

4. An operations, administration, and maintenance (OAM) processing device, disposed in a network element on an Asynchronous Transfer Mode (ATM) network, for supporting management of operations and maintenance of the ATM network, the OAM processing device comprising:

extraction means for extracting a Virtual Path Identifier and Virtual channel Identifier (VPI/VCI) from an incoming ATM cell;

alarm detection means for detecting a Virtual Path Alarm Indication Signal (VP-AIS) from the incoming ATM cell;

an entry data memory storing VPIs/VCIs that are previously registered thereto;

a conversion table, which is enabled when said entry data memory indicates that the extracted VPI/VCI is among the plurality of registered VPIs/VCIs, to convert the plurality of registered VPI/VCIs to new VPIs/VCIs;

first output means for generating, in response to the VPI/VCI extracted by said extraction means, a new VPI/VCI 1-bit coincidence signal corresponding to the extracted VPI/VCI by using the conversion table, only when the extracted VPI/VCI coincides with one of the plurality of registered VPIs/VCIs;

second output means for generating, in response to the VPI-AIS detected by said alarm detection means, new VPIs-VCIs by retrieving all relevant VPIs/VCIs out of the entry data memory and then converting the retrieved VPIs to the new VPIs by using the conversion table, wherein said all relevant VPIs/VCIs include VPIs/VCIs related to all Virtual Channels (VCs) belonging to a Virtual Path (VP) to be affected by the physical layer alarm;

memory sharing means for enabling said first output means and said second output means to share said entry data memory; and new header replacing means coupled to said first output means for replacing a VPI/VCI field as part of a header of the incoming ATM cell with the new VPI/VCI generated by said first output means; and VC-AIS cell output means coupled to said second output means for generating and transmitting a plurality of Virtual Connection Alarm Indication Signal (VC-AIS) cells corresponding to the new VPIs/VCIs which are generated by said second output means in response to the VP-AIS.

5. An operations, administration, and maintenance (OAM) processing device, disposed in a network element on an Asynchronous Transfer Mode (ATM) network, for supporting management of operations and maintenance of the ATM network, the OAM processing device comprising:

extraction means for extracting a Virtual Path identifier and Virtual Channel Identifier (VPI/VCI) from an incoming ATM cell;

an entry data memory storing VPIs/VCIs that are previously registered thereto;

1-bit coincidence signal output means for generating, in response to the VPI/VCI extracted by said extraction means, a VPI/VCI coincidence signal when said entry data memory indicates that the extracted VPI/VCI is one of the plurality of registered VPIs/VCIs; and a plurality of processing means, each coupled to said coincidence signal output means, for applying a plurality of processes to the incoming ATM cell for operation and maintenance purposes, using the VPI/VCI coincidence signal to determine whether any idle ATM cell is present or not.

6. The OAM processing device according to claim 5, wherein said plurality of processing means include an alarm handler unit.

7. The OAM processing device according to claim 5, wherein said plurality of processing means include a Performance Monitor (PM) unit.

8. The OAM processing device according to claim 5, wherein said plurality of processing means include a Usage Parameter Control (UPC) unit.

9. An operations, administration, and maintenance (OAM) processing device, disposed in a network element in an Asynchronous Transfer Mode (ATM) network, for supporting management of operations and maintenance of the ATM network, the OAM processing device comprising:

extraction means for extracting a Virtual Path Identifier and Virtual Channel Identifier (VPI/VCI) field from an incoming ATM cell;

range violation signal output means, responsive to the VPI/VCI extracted by said extraction means, for generating a range violation signal when the extracted VPI/VCI field exhibits that a VPI/VCI value of the incoming ATM cell is out of a predetermined range, and a plurality of processing means for applying a plurality of processes to the incoming ATM cell for operation and maintenance purposes, taking a present state of the range violation signal into consideration.

10. The OAM processing device according to claim 9, wherein said plurality of processing means include an alarm handler unit.

11. The OAM processing device according to claim 9, wherein said plurality of processing means include a Performance Monitor (PM) unit.

12. The OAM processing device according to claim 9, wherein said plurality of processing means include a Usage Parameter Control (UPC) unit.

13. An operations, administration, and maintenance (OAM) processing device, disposed in a network element in an Asynchronous Transfer Mode (ATM) network, for supporting management of operations and maintenance of the ATM network, the OAM processing device comprising:

monitoring means for monitoring incoming traffic of user data cells as well as extracting a payload content of each incoming Performance Monitor (PM) cell;

first calculation means for calculating prescribed data items for each PM block, which data items indicate performance of the user data cells, the PM block being a time interval between two consecutive PM cells;

second calculation means for collecting the data items calculated by said first calculation means for all the PM blocks and summarizing the collected data items;

storage means coupled to said second calculation means for temporarily storing the summarized data items separately for individual VP/VC channels; and control means for retrieving the summarized data items stored in said storage means at predetermined polling interval and performing operations and maintenance services based on the summarized data items retrieved.

14. The OAM processing device according to claim 13, further comprising:

activated VPI/VCI storage means for storing the VPIs/VCIs of VP/VC channels which were activated, and address generation means for generating an address to make access to said activated VPI/VCI storage means, which address is also used for addressing said storage means.

15. The OAM processing device according to claim 14, further comprising sequential number generation means for generating sequential numbers as many as the number of PM data items, wherein address inputs of said storage means is composed of high-order bits and low order bits, the high-order bits are driven by the address generated by said address generation means as high-order bits, and the low-order bits are driven by the sequential numbers generated by said sequential number generation means.

16. An operations, administration, and maintenance (OAM) processing device, disposed in a network element on an Asynchronous Transfer Mode (ATM) network, for supporting management of operations and maintenance of the ATM network, the OAM processing device comprising:

extraction means for extracting a Virtual Path Identifier and Virtual Channel Identifier (VPI/VCI) from an incoming ATM cell;

alarm detection means for detecting a physical layer alarm in an incoming synchronization frame signal;

an entry data memory storing VPIs/VCIs that are previously registered thereto;

first output means for generating, in response to the VPI/VCI extracted by said extraction means, a VPI/VCI 1-bit coincidence signal when the extracted VPI/VCI coincides with one of the plurality of registered VPIs/VCIs stored in the entry data memory;

second output means for generating, in response to the physical layer alarm detected by said alarm detection means, all VPIs/VCIs related to the physical layer alarm by retrieving all relevant entries out of the entry data memory;

memory sharing means for enabling said first output means and said second output means to share said entry data memory; and VC-AIS cell output means coupled to said output means for generating a plurality of Virtual Channel Alarm Indication Signal (VC-AIS) cells corresponding to the VPIs/VCIs generated by said second output means.

* * * * *